United States Patent
Tatem et al.

(10) Patent No.: US 12,553,753 B2
(45) Date of Patent: Feb. 17, 2026

(54) ULTRASONIC FLOW METER INCLUDING REFLECTORS POSITIONED BY INJECTION MOLDING TOOL

(71) Applicant: Badger Meter, Inc., Milwaukee, WI (US)

(72) Inventors: Logan Tatem, Grafton, WI (US); Daniel James Brennan, Whitefish Bay, WI (US); Kirk Patrick Henderson, Oconomowoc, WI (US)

(73) Assignee: Badger Meter, Inc., Milwaukee, WI (US)

( * ) Notice: Subject to any disclaimer, the term of this patent is extended or adjusted under 35 U.S.C. 154(b) by 368 days.

(21) Appl. No.: 17/859,618

(22) Filed: Jul. 7, 2022

(65) Prior Publication Data

US 2024/0011807 A1    Jan. 11, 2024

(51) Int. Cl.
| | | |
|---|---|---|
| *G01F 1/66* | (2022.01) | |
| *B29C 45/14* | (2006.01) | |
| *B29C 45/26* | (2006.01) | |
| *B29L 31/00* | (2006.01) | |

(52) U.S. Cl.
CPC ........ *G01F 1/662* (2013.01); *B29C 45/14065* (2013.01); *B29C 45/2606* (2013.01); *B29K 2995/003* (2013.01); *B29L 2031/752* (2013.01)

(58) Field of Classification Search
CPC ................... G01F 1/662; G01F 15/006; B29C 45/14065; B29C 45/2606; B29L 2031/752
See application file for complete search history.

(56) References Cited

U.S. PATENT DOCUMENTS

| | | | | |
|---|---|---|---|---|
| 2006/0196278 A1* | 9/2006 | Kroemer | ................. | G01F 1/667 |
| | | | | 73/861.18 |
| 2006/0288798 A1* | 12/2006 | Kroemer | ................. | G01F 1/667 |
| | | | | 73/861.18 |
| 2008/0271544 A1* | 11/2008 | Rickli | ..................... | G01F 1/662 |
| | | | | 73/861.28 |

(Continued)

FOREIGN PATENT DOCUMENTS

| | | |
|---|---|---|
| CN | 111426358 A | 7/2020 |
| CN | 111829602 A | 10/2020 |
| KR | 20080080556 A | 9/2008 |

OTHER PUBLICATIONS

Translation of CN111829602.*
International Search Report and Written Opinion dated Oct. 26, 2023 for PCT/US2023/026600.

*Primary Examiner* — Helen C Kwok
(74) *Attorney, Agent, or Firm* — Boyle Fredrickson SC (57) ABSTRACT

A computer-implement method for forming a flow insert for an ultrasonic flow meter. The method includes positioning one or more reflectors in a flow insert cavity configured to receive plastic by injection molding and configured to define an ultrasonic signal path based on machined surfaces of the mold and fixing the one or more reflectors in position along the ultrasonic signal path extending into the flow insert cavity. The method further includes forming a flow insert body by injection molding and configured to define an ultrasonic signal path within a flow conduit that includes one or more reflectors integrated within the flow insert body during the injection molding and providing ultrasonic signal reflection along the ultrasonic signal path.

19 Claims, 5 Drawing Sheets

(56) References Cited

U.S. PATENT DOCUMENTS

| | | | |
|---|---|---|---|
| 2010/0084034 A1* | 4/2010 | Sonnenberg | G01F 1/667 138/44 |
| 2011/0079090 A1* | 4/2011 | Kroemer | G01F 1/662 73/861.25 |
| 2011/0088483 A1* | 4/2011 | Will | G01F 15/18 29/527.1 |
| 2013/0047743 A1* | 2/2013 | Sonnenberg | H10N 30/87 73/861.18 |
| 2017/0211956 A1* | 7/2017 | Drachmann | G01F 1/667 |
| 2018/0010940 A1* | 1/2018 | Sonnenberg | G01F 15/028 |
| 2018/0290353 A1* | 10/2018 | Oono | B29C 45/28 |
| 2019/0072421 A1* | 3/2019 | Drachmann | G01F 1/667 |
| 2020/0096372 A1* | 3/2020 | Fuchs | G01F 1/662 |
| 2020/0249060 A1* | 8/2020 | Helfenstein | G01F 1/667 |
| 2020/0386591 A1* | 12/2020 | Scarborough, III | G01N 29/223 |
| 2021/0080302 A1* | 3/2021 | Davey | G01F 1/662 |
| 2022/0203441 A1 | 6/2022 | Valisalo et al. | |
| 2022/0214202 A1* | 7/2022 | Laursen | G01F 1/662 |
| 2022/0234263 A1* | 7/2022 | Tsuboi | B29C 45/53 |
| 2023/0160731 A1* | 5/2023 | Yoo | G01F 15/14 73/861.18 |
| 2023/0375386 A1* | 11/2023 | Helfenstein | G01F 15/14 |

\* cited by examiner

ULTRASONIC FLOW METER INCLUDING REFLECTORS POSITIONED BY INJECTION MOLDING TOOL

FIELD OF THE INVENTION

This application relates to an ultrasonic flow meter insert, a tool for forming an ultrasonic flow meter insert and a method for forming an ultrasonic flow meter insert, the insert having fixed reflectors defining a signal path. More particularly, the present application relates to such an insert, tool and method where the reflectors are fixed in the ultrasonic flow meter insert during formation of the insert.

BACKGROUND

An ultrasonic flowmeter uses sound waves to determine the velocity of a fluid or gas travelling through a conduit. For expediency, the present application will refer to a fluid, but one or ordinary skill in the art would understand that the principles are similar for gases. The flowmeter includes two or more transducers spaced apart for each other that send and receive ultrasonic signals forward (with the direction of the flowing fluid) and backward (against the direction of the flowing fluid). When fluid is flowing through the conduit, the backward signal will travel slower and take more time than the forward signal. When the fluid moves faster, the difference between the forward and backward signal times increases.

Transit-time ultrasonic flowmeters rely on ultrasonic transducers to send a signal or "beam" at an angle from one side of a pipe to the other. Often this signal is reflected to the sending side of the pipe. The flowmeter calculates flowrate by comparing the difference between the "transit time" of the signal when it travels with the flow stream and when it travels against the flow stream. A signal path is the path of the ultrasonic signal as it travels between the sender and receiver transducers. The signal path may be straight across a conduit, may include a reflection across the conduit and back again, etc. Where the signal is reflected, the ultrasonic flowmeter uses a reflector the change the direction of the ultrasonic signal. A reflected signal is often used to reduce any potential error caused by a non-uniform velocity profile, swirl, etc. A reflected signal further provides a longer signal path length, allowing for greater timing resolution, different flow pressures, etc. A longer signal path is extended by each reflector changing the direction of the ultrasonic signal.

Ultrasonic flow meters use the path length of the signal to determine the velocity of the fluid being transported through the conduit. A longer signal path may be defined by including additional reflections. However, reflectors may have slight variations in positioning caused by, for example, errors during installation, shifts in their holding brackets, variations in the surface to which they are fixed, etc. With each reflector, the potential for variation and the stacking effect of each additional variation will cause variations in the signal path length, the reflections of the ultrasonic signals, etc.

What is needed is an ultrasonic signal flow meter configured to be able to send and receive an ultrasonic signal that is less subject to variation. What is further needed is such an ultrasonic flow meter configured to reduce such variability during the formation of the ultrasonic flow meter.

SUMMARY OF THE INVENTION

The present invention is directed to an ultrasonic flow meter insert, a method for forming such an insert, and a forming tool for forming an ultrasonic flow meter insert where the insert includes reflectors that are positioned by within injection molded insert body. The reflectors are positioned by being fixed into position by the forming tool prior to the injection molding process that fixes their position within the injection molded insert body.

In one more detailed aspect, computer-implement method for forming a flow insert for an ultrasonic flow meter. The method includes positioning one or more reflectors in a flow insert cavity configured to receive plastic by injection molding and configured to define an ultrasonic signal path based on machined surfaces of the mold and fixing the one or more reflectors in position along the ultrasonic signal path extending into the flow insert cavity. The method further includes forming a flow insert body by injection molding and configured to define an ultrasonic signal path within a flow conduit that includes one or more reflectors integrated within the flow insert body during the injection molding and providing ultrasonic signal reflection along the ultrasonic signal path.

In another more detailed aspect, a flow insert for an ultrasonic flow meter is described that includes a flow insert body formed by injection molding and configured to define an ultrasonic signal path within a flow conduit and one or more reflectors integrated within the flow insert body during the injection molding and providing ultrasonic signal reflection along the ultrasonic signal path.

In another embodiment of the invention, the position of each of the one or more reflectors is fixed during formation of the flow insert body. Further, at least one of the reflectors may be fixed in position by the injected plastic on at least a base side and one or more edges. Yet further, at least one other of the reflectors may be fixed in position by the injected plastic on at least a reflective side and one or more edges.

In another embodiment of the invention, the angular orientation of the one or more reflectors relative to each other and to a plurality of transducer openings in the flow insert body is fixed by the injected plastic during the formation of the flow insert. Further, the flow insert may include at least two shapes of the one or more reflectors, further wherein the injected molded plastic secures each shape of reflector differently.

In another more detailed aspect, an injection molding mold for use with an injection molding tool to form a flow insert for an ultrasonic flow meter is described. The mold includes a flow insert cavity configured to receive plastic by injection molding and configured to define an ultrasonic signal path based on machined surfaces of the mold and provide one or more reflector positions along the ultrasonic signal path extending into the flow insert cavity configured to receive a reflector prior to the injection molding.

In another embodiment of the invention, the mold further includes a reflector position surface configured to fix the position of each of the one or more reflectors during formation of the flow insert body. In another embodiment, the flow insert cavity is configured such that at least one of the reflectors is fixed in position by the injected plastic on at least a base side and one or more edges. Further, the flow insert cavity may be configured such that at least one other of the reflectors is fixed in position by the injected plastic on at least a reflective side and one or more edges.

In another embodiment of the invention, the flow insert cavity may be configured such that the angular orientation of the one or more reflectors relative to each other and to a plurality of transducer openings in the flow insert body is fixed by the injected plastic during the formation of the flow insert. Further, the flow insert cavity may be configured such that the one or more reflectors will be positioned along the ultrasonic signal path by a machined surface of the mold. Yet further, the position may be fixed independent of the shape of the one or more reflectors.

Other aspects of the invention, besides those discussed above, will be apparent to those of ordinary skill in the art from the description of exemplary embodiments which follows. In the description, reference is made to the accompanying drawings, which form a part hereof, and which illustrate examples of the invention.

DETAILED DESCRIPTION OF THE INVENTION

Figure 1A:
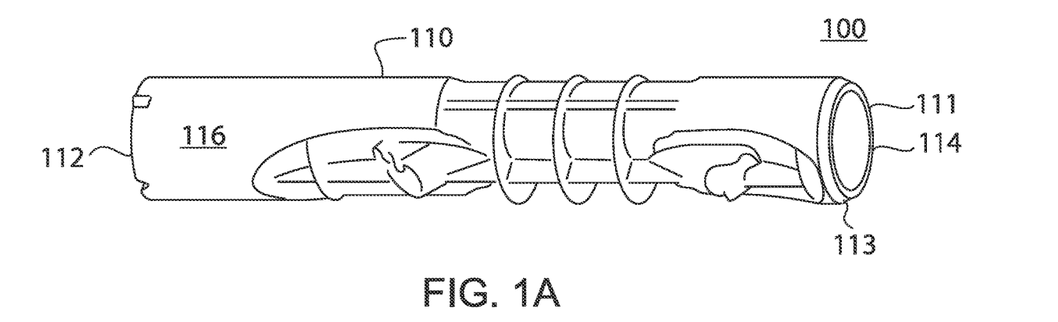
FIGS. 1A and 1B are a perspective view and a cutaway view, respectively, of an ultrasonic flow meter insert, according to an exemplary embodiment.
Figure 1B:
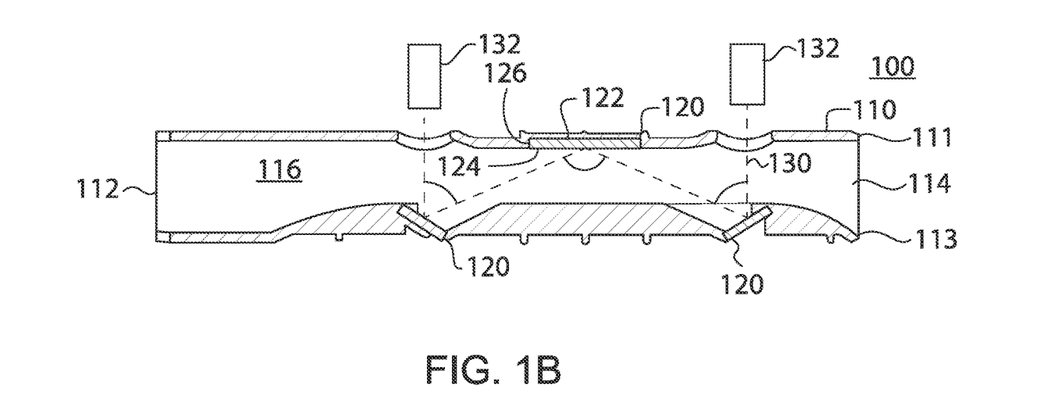

Referring first to FIGS. 1A and 1B, a perspective view and a cutaway view, respectively, of an ultrasonic meter flow insert 100 is shown, according to an exemplary embodiment. An ultrasonic meter flow insert 100 is typically inserted into a housing (not shown) for an ultrasonic flow meter and is used to define the ultrasonic flow meter signal path, condition fluid flowing through the ultrasonic flow meter, support and fix reflectors along the signal path, etc.

Flow insert 100 includes an insert body 110, the body 110 defining a fluid inlet 112, a fluid outlet 114 and a fluid conduit 116. Insert body 110 is an injection molded component formed from injected plastic such as acrylic, polycarbonate, polyethylene, polypropylene, polystyrene, thermoplastic, elastomer, etc. as are known in the art. Although shown in an assembled state in FIG. 1A, body 110 may include a top portion 111, further shown and described below with reference to FIGS. 2A-B, and a bottom portion 113, further shown and described below with reference to FIGS. 3A-C.

Flow insert 100 includes one or more reflectors 120 that are not made of injected plastic but are positioned and fixed within the injection molded insert body 110 during the injection molding process. Reflectors 120 may be formed from stainless steel as is known in the art. Reflectors 120 are configured to define an ultrasonic signal path 130 between first and second transducers 132. In the embodiment shown in FIG. 1G, reflectors 120 define a three-bounce signal path 130 between the transducers 132. One of ordinary skill in the art would understand that a different numbers, types, shapes, etc. of reflectors 120 and shapes of insert body 110 may be used in implementing the present invention.

Reflectors 120 may be configured to include a base side 122, a reflective side 124 and one or more edges 126. The base side 122 is configured to abut the body 110 and face outward from the fluid conduit 116. The reflective side 124 is configured to face the fluid conduit 116 and face outward from the body 110. Reflective side 124 may be configured to maximize the reflective of received ultrasonic signals. Edges 126 extend between the base side 122 and the reflective side 124. The number of edges 126 will depend on the shape of the reflector 120. Different shaped reflectors 120 may be used within a single flow insert 100 as shown and described here.

When receiving an ultrasonic signal, each reflector 120 reflects the signal in a different direction than the direction from which it was received. The angle between the receiving direction and the reflecting direction may be used during the design of the insert body 110 and in determining the expected length of the ultrasonic signal path 130. Any deviation from the expected angle can change the length of the actual ultrasonic signal path 130. Further, a deviation in a first reflector 120 may be amplified by a deviation in a second reflector 120. This effect may be referred to mechanical tolerance stackup variability. Accordingly, tight angular control is an important factor in positioning and maintaining the position of reflectors 120 within insert body 110.

Insert body 110 is configured such that reflectors 120 are positioned and fixed relative to each other and to transducers 132 during the injection molding of the insert body 110 by an injection molding tool 400, described below with reference to FIG. 4. Each reflector 120 base side 122 abuts the insert body 110 and the reflector 120 is held in place by injection molded plastic. Reflectors 120 may be held in position by injection molded plastic compressing edges 126 and/or extending over a small portion of reflective side 124.

Alternatively, a reflector 120 may be attached to insert body 110 by external means, such as a screw extending through body 110 and into a screw opening in the reflector 120. In this embodiment, the screw will pull the reflector 120 against the insert body 110 such that the base 122 of the reflector 110 against the insert body 110, formed during the injection molding process, defines the position of the reflector 120.

In operation, the reflectors 120 are positioned prior to the injection molding creation of the insert body 110, as further described below. The injection molding process is then used to secure the reflectors in that position. Advantageously, positioning the reflectors 120 independent from the insert body 110 solves the problem of angular variation in the reflectors 120 across which the ultrasonic signal travels by eliminating any variations within the insert body 110.

Figure 2A:
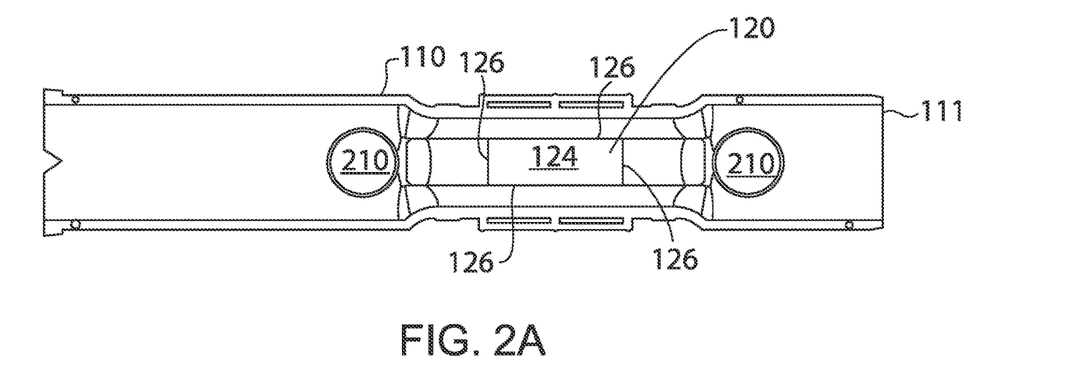
FIGS. 2A and 2B are a top-down internal view and a cutaway view, respectively, of an upper portion of the ultrasonic flow meter insert of FIG. 1A, according to an exemplary embodiment.
Figure 2B:
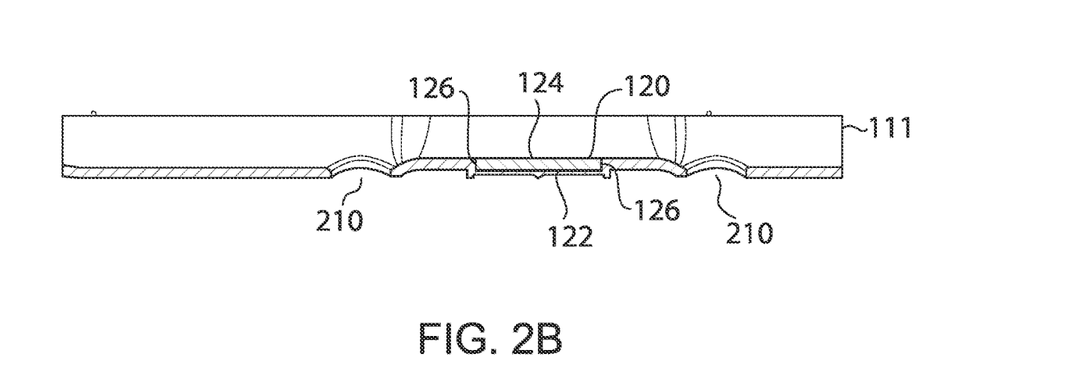

FIGS. 2A and 2B are a top-down internal view and a cutaway view, respectively, of the top portion 111 of insert body 110 of FIG. 1A, according to an exemplary embodiment. Referring first to FIG. 2A, insert body 110 is configured to further include transducer openings 210. Transducer openings 210 receiving transducers 132 and/or allow the ultrasonic signal from these transducers 132 to pass unimpeded into fluid conduit 116.

Referring now also to FIG. 2B, reflector 120 is shown molded into the insert body 110 in the top portion 111. Reflector 120 is shown as a rectangular reflector in this embodiment although a different shape may be used. The injection molding process allows for the use of different shaped reflectors 120, seated within the injection molding tool described below with reference to FIG. 4. The injection process will hold them in the position set by the injection molding tool independent of the shape of the reflector 120. In other words, the injected plastic with mold and fix the reflector 120 into position independent of the shape.

Figure 3A:
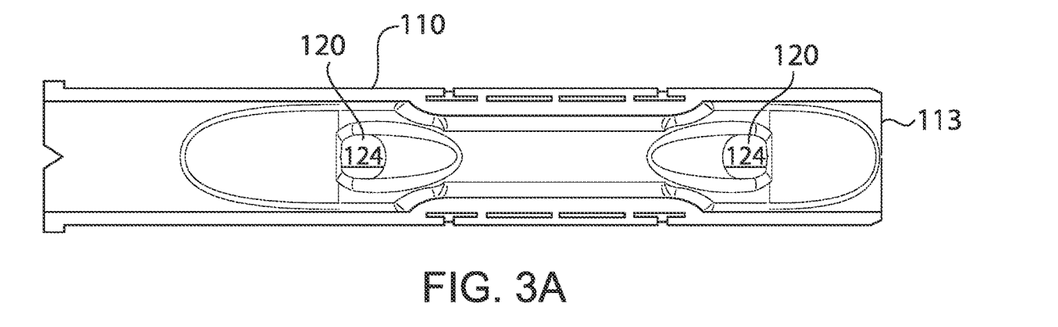
FIGS. 3A, 3B and 3C are a top-down internal view, a cutaway view, and a cross section view, respectively, of a lower portion of the ultrasonic flow meter insert of FIG. 1A, according to an exemplary embodiment.
Figure 3B:
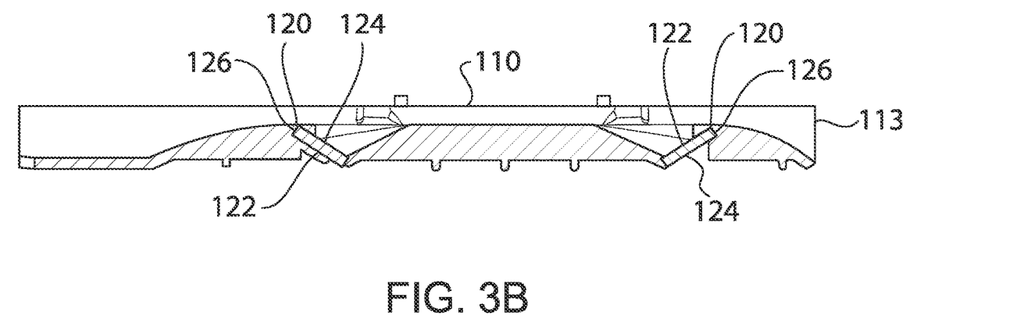
Figure 3C:
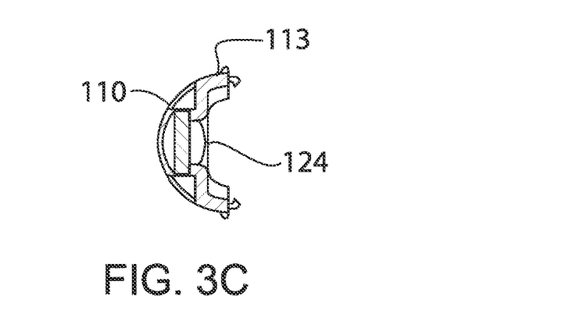

FIGS. 3A, 3B and 3C are top-down internal view, a cutaway view, and a cross section views, respectively, of the bottom portion 113 of the insert body 110 of FIG. 1A, according to an exemplary embodiment. Referring first to FIG. 3A, insert body 110 is configured to further include transducer openings 210. Transducer openings 210 receiving transducers 132 and/or allow the ultrasonic signal from these transducers 132 to pass unimpeded into fluid conduit 116.

Referring now also to FIGS. 3B and 3C, reflector 120 is shown molded into the insert body 110 in the bottom portion 113. Reflector 120 is shown as a circular reflector in this embodiment although a different shape may be used. As shown most clearly in FIG. 3B, and also with reference to FIG. 2B, a reflector 120 may be held within insert body 110 in a variety of manners. FIG. 3B shows the reflector 120 fixed into position by injection molded plastic along a portion of the base side 122, the entirety of the edge 126 and a portion of the reflective side 124. Thus, the reflective side 124 may be covered in part by the injection molded plastic without interference with the signal path 130 between transducers 132.

Figure 4:
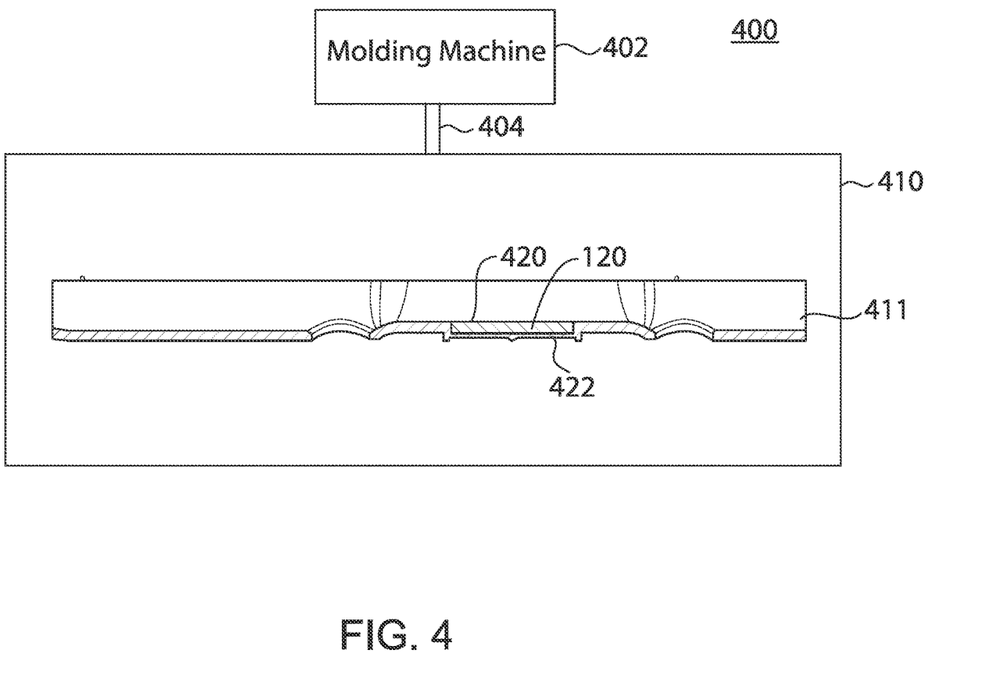
FIG. 4 is a block diagram representative of an injection molding tool configured for forming the lower portion of the ultrasonic flow meter insert of FIG. 1A, according to an exemplary embodiment.

FIG. 4 block diagram representative of an injection molding tool 400 configured for forming the upper portion 111 of the ultrasonic flow meter insert of FIG. 1A, according to an alternative embodiment. Injection molding machines are known in the art. The molding machine 402 heats a plastic until it is liquid. The nozzle 404 of the injection molding machine 402 then injects the melted plastic into the mold 410. In this instance, the mold 410 includes an upper portion cavity 411 correlated to upper portion 111. It is understood that a similar mold having a lower portion cavity is used for bottom portion 113. The mold is formed by machining to form the upper portion cavity 411 in the shape of upper portion 111.

In the present invention, reflector 120 is positioned within the mold 410 in upper portion cavity 411 prior to the injection molding. The reflector 120 is positioned against a machined surface of the mold such that the reflective side 124 is positioned against a reflector position 420 having a machined surface. Advantageously, positioning the reflector 120 against the machined surface provides greater positioning control and thus angular control of the position of the reflector 120 within the finished insert body. During the injection molding, the reflector 120 may be held into position by several means, such as opposing portions 422 of the mold not included in the upper portion cavity 411, a temporary support structure removed by post injection trimming as is know the art, using vacuum suction, etc. The temporary support structures and/or opposing sides guide the injection molded plastic to secure the reflector 120 in position without impeding the signal path interaction with the reflective side 124.

Mold 410 is configured such that the reflector position 420 has a particular angular orientation relative to reflector positions for the similar mold of the lower portion 111. Because each reflector position 420 is a machined surface, these angular orientations will eliminate variations in the angular orientation of the positioned reflectors 120 when they are injection molded into position. The collective angular orientations define the signal path length such that the signal path length also will have minimized variations.

Following the positioning of the reflector 120 within the upper portion cavity 411, the cavity of the mold is filled with the plastic liquid by injection molding as is known in the art. The product removed from the molding tool 400 will be an upper portion 111 including an integral reflector 120 that was positioned by the molding tool 400.

Figure 5:
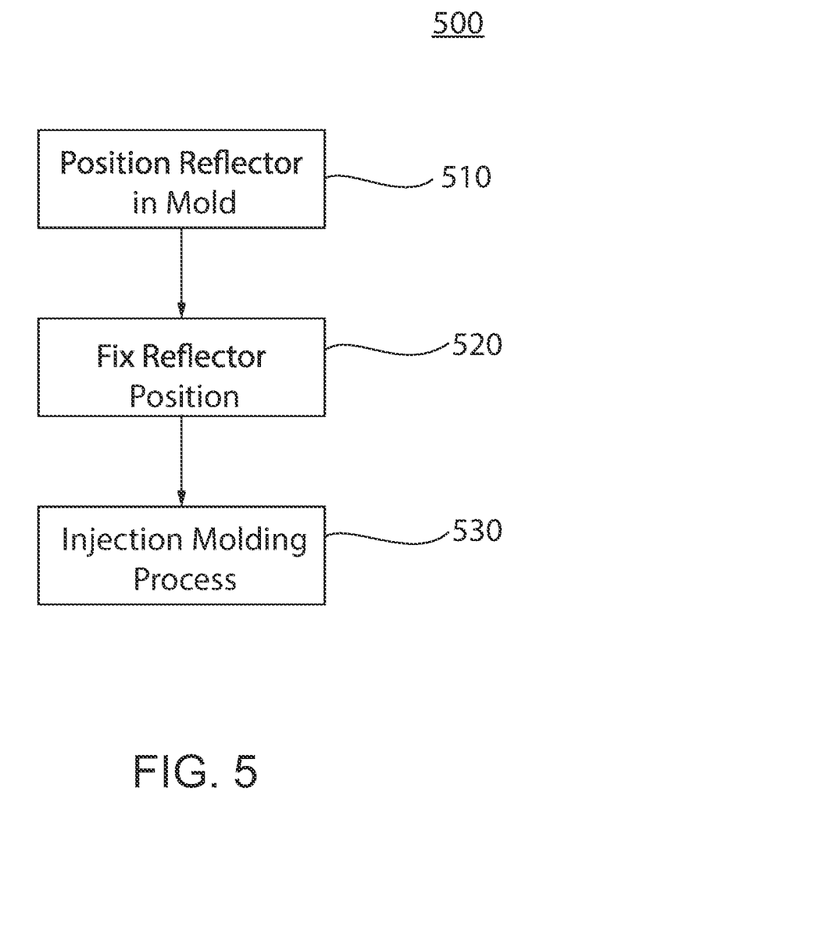
FIG. 5 is a flowchart illustrating a method for forming an ultrasonic meter flow insert including integral reflectors fixed in position during injection molding of the flow insert, according to an exemplary embodiment.

FIG. 5 is a flowchart 500 illustrating a method for forming an ultrasonic meter flow insert including integral reflectors fixed in position during injection molding of the flow insert, according to an exemplary embodiment. The method may be implemented by a computer processor and manufacturing machinery, such as molding tool 400, as described below. The computer system implementing the method may include a processor configured to implement a computer program stored in nonvolatile memory to implement the functionality described herein.

In a step 510, one or more reflectors 120 are positioned in a mold for an injection molding tool 400. In the present invention, the reflector 120 is positioned abutting a machine surface. In a step 520, the reflector is fixed into position within the mold of the injection molding tool 400.

In a step 530, following the positioning of the reflector 120 within the upper portion cavity 411, the cavity of the mold is filled with the plastic liquid by injection molding as is known in the art.

The present invention enables reflectors 120 to be positioned directly again machined surfaces of an injection molding tool 400. The plastic is then injected around the reflectors 120 to form a flow insert 100 having improved angular control being driven primarily by the machined surfaces. The present invention thus eliminates the mechanical tolerance stackup variability inherent with using reflectors 120 that are separate from the flow insert 100.

This has been a description of exemplary embodiments, but it will be apparent to those of ordinary skill in the art that variations may be made in the details of these specific embodiments without departing from the scope and spirit of the present invention, and that such variations are intended to be encompassed by the following claims.

We claim:

1. An injection molding mold for use with an injection molding tool to form a flow insert for an ultrasonic flow meter, comprising
   a mold body configured to be used to form a plurality of flow inserts in an injection molding process, the mold body including
      a flow insert cavity configured to receive plastic by injection molding for each flow insert to be formed in the injection molding process and configured to define an ultrasonic signal path through a flow channel formed in each flow insert that will reflect an ultrasonic signal back and forth across the flow channel based on machined surfaces of the mold; and
      one or more reflector positions along the ultrasonic signal path extending into the flow insert cavity configured to receive a respective reflector that will reflect the ultrasonic signal along the ultrasonic signal path across the flow channel formed in the flow insert prior to the injection molding used to form each flow insert.

2. The injection molding mold of claim 1, further including a reflector position surface configured to fix a position of the respective reflector received at the one or more reflector positions during formation of the flow insert.

3. The injection molding mold of claim 1, wherein the flow insert cavity is configured such that at least one respective reflector is fixed in position by the injected plastic on at least a base side and one or more edges.

4. The injection molding mold of claim 3, wherein the flow insert cavity is configured such that at least one respective reflector is fixed in position by the injected plastic on at least a reflective side and one or more edges.

5. The injection molding mold of claim 1, wherein the flow insert cavity is configured such that an angular orientation of the respective reflector received at the one or more reflector positions relative to at least a second respective reflector received at the one or more reflector positions and to a plurality of transducer openings in the flow insert is fixed by the injected plastic during formation of the flow insert.

6. The injection molding mold of claim 5, wherein the flow insert cavity is configured such that the respective reflector received at the one or more reflector positions is positioned along the ultrasonic signal path by a machined surface of the mold.

7. The injection molding mold of claim 6, wherein a position is fixed independent of the shape of the one or more reflectors.

8. A flow insert forming mold for an ultrasonic flow meter, comprising
a mold body configured to be used to form a plurality of flow inserts in an injection molding process, the mold body including
a flow insert body formed by injection molding within the mold body and configured to define an ultrasonic signal path through a flow channel formed in each flow insert that will reflect an ultrasonic signal back and forth across the flow channel based on machined surfaces of the mold; and
one or more reflectors positioned in the mold body prior to injection molding and integrated within the flow insert body during the injection molding and providing ultrasonic signal reflection along the ultrasonic signal path.

9. The flow insert of claim 8, wherein a position of each of the one or more reflectors is fixed during formation of the flow insert body.

10. The flow insert of claim 8, wherein at least one of the reflectors is fixed in position by injected plastic on at least a base side and one or more edges.

11. The flow insert of claim 10, wherein at least one other of the reflectors is fixed in position by injected plastic on at least a reflective side and one or more edges.

12. The flow insert of claim 8, wherein an angular orientation of the one or more reflectors relative to each other and to a plurality of transducer openings in the flow insert body is fixed by injected plastic during formation of the flow insert.

13. The flow insert of claim 12, wherein the flow insert includes at least two shapes of the one or more reflectors, further wherein the injected plastic secures each shape of reflector differently.

14. A computer-implement method for using a mold in forming a flow insert for an ultrasonic flow meter, comprising
positioning one or more reflectors in a flow insert cavity of a mold body configured to be used to form a plurality of flow inserts in an injection molding process that are wherein the cavity receives plastic by injection molding and defines an ultrasonic signal path through a flow channel formed in each flow insert that will reflect an ultrasonic signal back and forth across the flow channel based on machined surfaces of a mold;
fixing the one or more reflectors in position along the ultrasonic signal path extending into the flow insert cavity that will reflect the ultrasonic signal along the ultrasonic signal path across the flow channel formed in the flow insert; and
forming a flow insert body by injection molding to form each flow insert that includes one or more reflectors integrated within the flow insert body during the injection molding and providing ultrasonic signal reflection along the ultrasonic signal path.

15. The computer implemented method of claim 14, wherein the position of each of the one or more reflectors is fixed during formation of the flow insert body.

16. The computer implemented method of claim 14, wherein at least one of the reflectors is fixed in position by the injected plastic on at least a base side and one or more edges.

17. The computer implemented method of claim 16, wherein at least one other of the reflectors is fixed in position by the injected plastic on at least a reflective side and one or more edges.

18. The computer implemented method of claim 14, wherein an angular orientation of the one or more reflectors relative to each other and to a plurality of transducer openings in the flow insert body is fixed by the injected plastic during formation of the flow insert.

19. The computer implemented method of claim 18, wherein the flow insert includes at least two shapes of the one or more reflectors, further wherein the injected molded plastic secures each shape of reflector differently.

* * * * *